United States Patent
Hennig et al.

[11] 3,785,418
[45] Jan. 15, 1974

[54] COVER FOR MACHINE TOOLS

[76] Inventors: Arnold Hennig, Erlenstrasse 10, Ismaning; Kurt Hennig, Georgensteinstrasse 16, Munich, both of Germany

[22] Filed: Apr. 22, 1971

[21] Appl. No.: 136,489

[30] Foreign Application Priority Data
Apr. 24, 1970 Germany.................. P 20 20 109.6
Feb. 9, 1971 Germany.................. P 21 06 116.5

[52] U.S. Cl............... 150/52 R, 160/202, 160/222, 206/DIG. 11, 220/8, 308/3.5
[51] Int. Cl............................................ B65d 65/02
[58] Field of Search..................... 308/3.5; 160/197, 160/202, 222; 150/52 R; 220/8; 206/DIG. 11

[56] References Cited
UNITED STATES PATENTS
| | | | |
|---|---|---|---|
| 1,552,856 | 9/1925 | Judge | 220/8 |
| 3,436,928 | 4/1969 | Swerbinsky | 220/8 |
| 2,620,941 | 12/1952 | Smulski | 220/8 |
| 3,263,853 | 8/1966 | Smith | 220/4 R X |
| 856,588 | 6/1907 | Jones | 308/3.5 X |
| 3,565,153 | 2/1971 | Loos et al. | 308/3.5 X |
| 479,652 | 7/1892 | Marcee | 220/8 X |

*Primary Examiner*—Herbert F. Ross
*Assistant Examiner*—Stephen P. Garbe
*Attorney*—Learman & McCulloch

[57] ABSTRACT

A cover for a part, such as a guideway, of a machine tool comprises telescopic cover elements each having a cover plate and depending side and end walls having inwardly turned flanges at their lower ends so as to embrace the guideway. The walls are formed of an elastically flexible material to permit the cover to be snapped onto the guideway whereupon the walls and bent inwardly flanges engage the guideway with light spring pressure. Wiper strips are interposed between telescoping elements to effect cleaning of the parts in response to relative telescoping movements.

10 Claims, 8 Drawing Figures

COVER FOR MACHINE TOOLS

The invention concerns a cover for machine tools, consisting of a number of telescopically engaging cover elements which fit around the part of the machine tool to be covered.

With known telescopic covers the cover elements are usually during mounting slid along from the one end of the machine part (for example a guideway) to be covered. in cases in which this type of mounting is not possible, since the ends of the machine part to be covered are not accessible, with the former known covers separate parts of the cover elements, which in the mounted position are to engage behind the machine part to be covered, are detachably formed and are fitted only after positioning of the cover elements. Consequently a complicated mounting and a correspondingly expensive dismounting (for repair or maintenance reasons) is required.

The objects of the invention are to avoid these defects of known constructions and to develop a cover which can also be mounted and dismounted in a simple manner if neither of the two ends of the machine tool part to be covered are freely accessible.

According to the invention these objects are achieved in that at least one region of each cover element is sufficiently elastically flexible that the cover element can be snapped perpendicularly to its normal direction of movement onto the part of the machine tool to be covered.

Such a construction makes it possible to mount the cover element directly, especially from the front, onto the part of the machine tool, for example a guideway, to be covered. Accordingly one can both dispense with exposing the ends of the machine part to be covered, and also avoid the use of screwed on retaining flanges. In this way the mounting and dismounting of the cover are considerably facilitated and the time required for this is reduced to a fraction.

A construction of the cover especially simple for manufacture is moreover obtained according to the invention if the cover elements essentially consist of two pieces of plastics material of U-form in cross-section with integral gliders formed thereon, forming the side walls, and a cover plate connecting the two side walls.

Whilst with the former known covers the individual cover elements each had to be provided with a separate back wall, in order to fit the required gliders (which are to be supported on that surface of the guideway which is opposed to the cover plate of the cover element), with a cover according to the invention such a back wall as in the last mentioned arrangement is no longer used. The said gliders (which in horizontal positioning of the guideway are supported on the upper side of the same) are on the contrary formed each from a flange of the U-form pieces of plastics material, which pieces form at the same time the side walls and the flange engaging under the guideway. Several embodiments of the invention are illustrated in the drawing. It shows:

Figure 1:
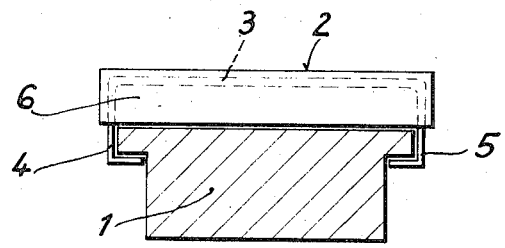
FIG. 1 is a schematic elevation of a cover element in position on a guideway according to a first embodiment.

The cover shown in FIGS. 1 – 3 serves for protection of a guideway 1 of a machine tool and consists of a number of telescopically engaging cover elements 2, 2', etc., of which in the following the cover element 2 is described in detail.

The cover element, made for example completely from plastics material, comprises essentially a cover wall 3, two side walls 4 and 5 bent inwards at their lower edges, and also a back wall 6. Thereby the cover wall 3 and the two side walls 4 and 5 including their in-bent lower edges can be formed from a single piece of plastics material, which is shaped by hot forming in the way evident from the drawing. The rear wall 6 is joined to this main part of the cover element in the way evident from FIG. 3. For this purpose the rear wall 6 includes a groove in which engage the cover wall 3 and at least partly (in the upper region) also the side walls 4 and 5. The joint between the said parts is made for example by ultrasonic welding.

Figure 2:
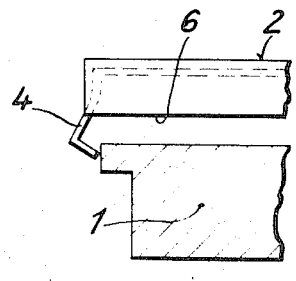
FIG. 2 is a fragmentary view similar to FIG. 1 for explanation of the mounting.

In order to be able to fit the cover element 2 perpendicularly to the normal direction of movement of the cover (in FIGS. 1 and 2 therefore from above) onto the guideway around which the cover elements are to fit, in the embodiment of FIGS. 1 and 2 the two side walls 4 and 5 are elastically flexible. For this reason the height of the rear wall 6 is preferably less than that of the side walls 4 and 5; moreover the side walls 4 and 5 are rigidly joined with the rear wall 6 only over a part of their height.

The shape and the dimensions of the cover element 2 and the thickness and the flexibility of the side walls 4 and 5 are so chosen that during mounting of the cover element (see FIG. 2) the side walls 4 and 5 can be bent so far outwards that a snap fitting of the cover element onto the guideway is made possible. In the mounted position (see FIG. 1) the edges of the side walls 4 and 5 of the cover element 2 then conveniently rest with light elastic pressure against the base of the guideway 1, whereby an excellent seal is obtained.

Figure 3:
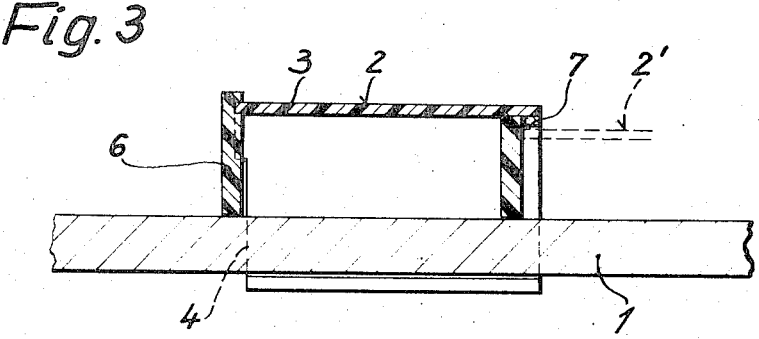
FIG. 3 is a schematic longitudinal section of the cover element according to FIGS. 1 and 2 in position on a guideway.

As FIG. 3 shows, the rear wall 6 protrudes somewhat above the cover wall 3, so that it forms at the same time an engagement stop for the next larger cover element. At its forward end the cover wall 2 carries a wiper 7, which is preferably formed by a single strip of plastics material. In the extended position of the telescopic cover this wiper 7 abuts the rear wall of the next smaller cover element.

The rear wall 6 of the cover element according to the invention forms at the same time the glider element supported on the guideway 1 as well as the lateral glider elements lying against the side walls of the next larger cover element. From this will be recognized the considerably simpler construction of the plastics cover element according to the invention as opposed to the conventional cover boxes made from sheet metal.

Figure 4:
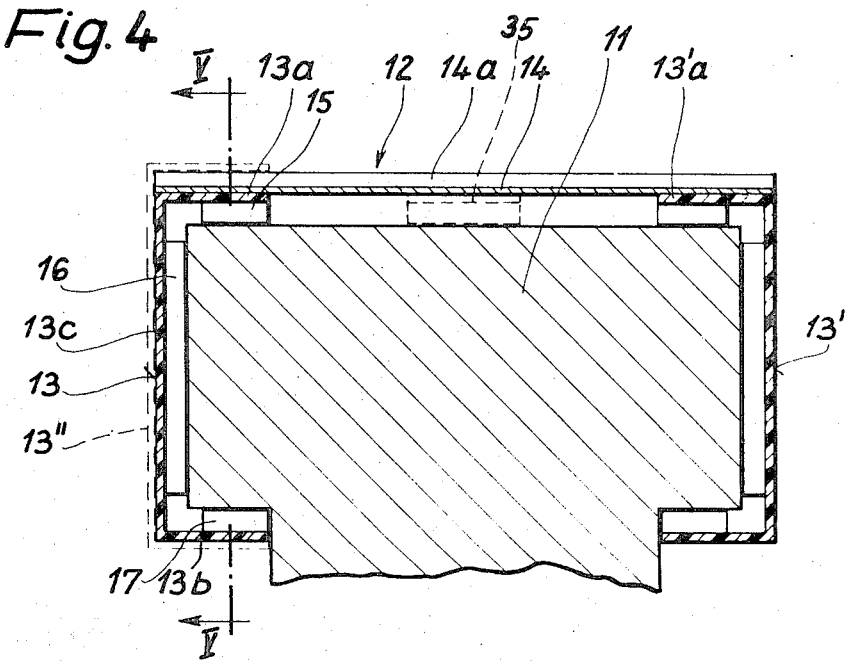
FIG. 4 is a cross-section -section of a second embodiment of a cover element according to the invention and taken along the line IV—IV of FIG. 5.
Figure 5:
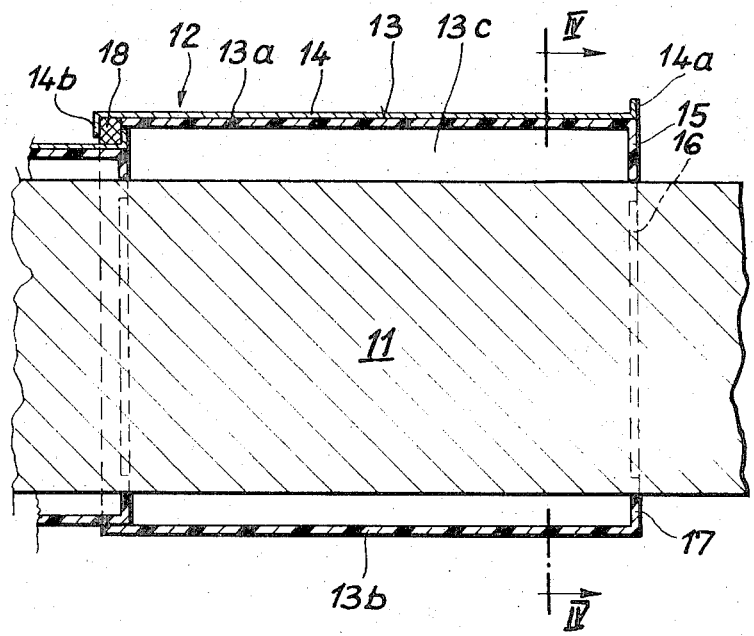
FIG. 5 is a longitudinal section along the line V—V of FIG. 4.
Figure 6:
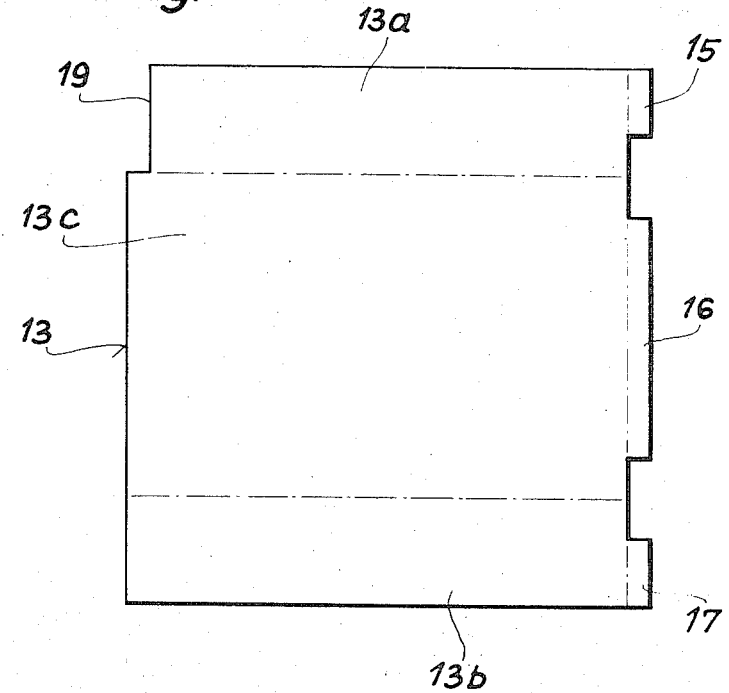
FIG. 6 is a plan view of a blank for manufacture of a U-form piece of plastics material with gliders formed thereon.

The further embodiment of the cover according to the invention shown in FIGS. 4 – 6 is intended for a guideway 11 of a machine tool. The cover consists of a number of telescopically engaging cover elements, of which in the following the cover element 12 is described in detail. It consists essentially of two pieces 13, 13' of plastics material of U-form in cross-section, forming the side walls, and a cover plate 14 joining the two pieces. In the region of their rear edges the U-form pieces 13, 13' of plastics material are bent so that rear wall or gliders 15, 16, 17 are thereby formed, which abut different faces of the guideway 11.

To form engagement faces the cover plate 14 is in the region of its rear edge 14a bent upwards, and in the region of its front edge 14b bent downwards. The cover plate is composed of a material of higher rigidity and strength, for example, steel plate.

In the region of the front edge 14b of the cover plate 14 is provided a wiper strip 18 made from plastics material, which is partly covered by the bent edge 14b and is retained against dropping out forwards. The flanges 13a, 13'a of the pieces 13, 13' of plastics material abutting the cover plate 14 are cut away in the region required for insertion of the wiper strip 18. This cutaway is indicated in FIG. 6 with the reference numeral 19.

FIG. 6 shows a blank of plastics material, from which for example the U-form piece 13 is made by bending over the two flanges 13a, 13b relative to the side wall piece 13c and also by simultaneous bending of the gliders 15, 16, 17. The chain-dotted lines of FIG. 6 indicate the lines of bending along which the bending is effected for example by means of high-frequency heating of the material.

The U-form pieces 13, 13' of plastics material each abut with its flange 13b remote from the cover plate 14 the guideway 11, preferably under elastic tension.

The left piece 13'' of plastics material (otherwise not illustrated) of the cover element is indicated in dotted lines in FIG. 4.

Figure 7:
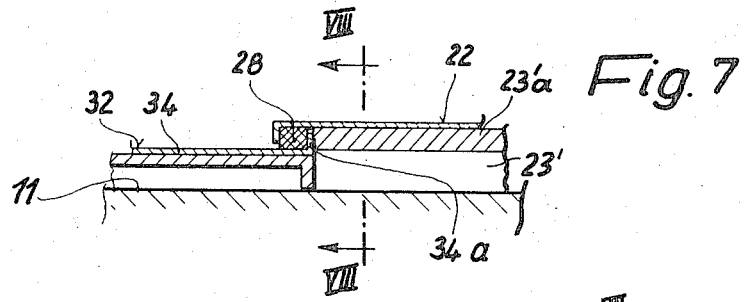
FIG. 7 is a part longitudinal section of a third embodiment taken along the line VII—VII of FIG. 8.
Figure 8:
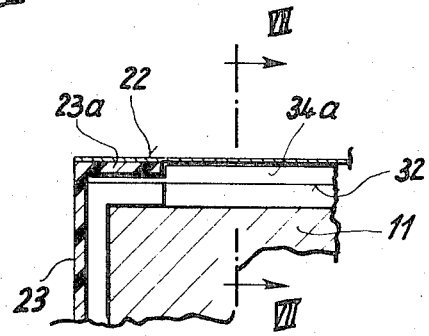
FIG. 8 is a part cross-section along the line VIII—VIII of FIG. 7.

In the embodiment of FIGS. 4 – 6 the height of the wiper strip 18 is larger than the thickness of the material of the U-form pieces 13, 13' of plastics material (see FIG. 5). FIGS. 7 and 8 show on the contrary a construction in which the height of the wiper strip 28 is chosen the same as the thickness of the material of the U-form piece 23 of plastics material. In this case the rear edge 34a of the cover plate 34 (of the next smaller cover element 32) is only bent upwards in the region between the flanges 23a and of the cover element 22 and abuts in this region the rear face of the wiper strip 28. As the drawing immediately reveals, in this way an especially space-saving flat construction of telescopically engaging cover elements is achieved.

With especially wide covers a further additional support glider 35 (in FIG. 4 indicated in dotted lines) can be provided in the middle region of the cover plate.

Within the scope of the invention numerous modifications are possible. So (especially in the first embodiment of FIGS. 1 – 3) the cover element can in the mounted position have a reinforcing part, which for the purpose of an increase in the elastic flexibility during mounting and dismounting is removable. This reinforcement piece can for example be provided in the middle region of the rear wall.

Also in respect of the materials employed and their combination numerous variations are possible. So especially the places of the regions of the cover elements composed of plastics material which are endangered by turnings can be protected by the metallic layer 14 or, if desired, by a fibre-glass reinforcement or by an especially heat-resisting plastics material in lieu of the metallic layer. For joining together the pieces of plastics material and also joining the pieces of plastics material and the metal pieces the various methods of joining (especially welded, adhesive, riveted, snap- and clamping joints) can be used.

We claim:

1. A cover for machine tools comprising a number of telescopically engaging cover elements adapted to be fitted for movement around the part of the machine tool to be covered, at least one region of each cover element being sufficiently elastically flexible that the cover element can be snapped perpendicularly to its normal direction of movement onto the part of the machine tool to be covered, each of said cover elements comprising a cover wall, a rear wall, and two side walls bent inwards toward one another at their edges to embrace said part, said side walls having a greater height than that of said rear wall and being of such elasticity as to rest with light elastic pressure sealingly against said part.

2. A cover according to claim 1 wherein the cover elements are manufactured at least partly from elastic, preferably thermoplastically mouldable plastics material.

3. A cover according to claim 1 including a rear wall forming a glider element adapted to be supported on the machine tool part to be covered and also the corres-ponding glider element lying against the side walls of the next larger cover element.

4. A cover according to claim 1 wherein said cover elements are manufactured partly from sheet metal and have an elastically flexible region composed of elastic material.

5. A cover according to claim 1 wherein selected positions of said cover elements are composed of plastics material and are protected by a material more durable than said plastics material.

6. A cover according to claim 1 wherein said cover walls are bent, in the region of their rear edges upwards and in the region of their front edges downwards, to form engagement faces.

7. A cover according to claim 6 wherein in the region of the front edge of each of said cover walls is provided a wiper strip, made at least partly from plastics material and partly covered by the bent edge.

8. A cover according to claim 7 wherein each of the side walls adjacent the cover wall is cut away in the region required for insertion of the wiper strip.

9. A cover according to claim 8 wherein the height of the wiper strip is at least equal to the thickness of the material of the side walls.

10. A cover according to claim 1 wherein the cover wall is formed from a material of higher rigidity and strength than that of said side walls.

* * * * *